(12) United States Patent
Brown et al.

(10) Patent No.: US 11,927,210 B2
(45) Date of Patent: *Mar. 12, 2024

(54) LOCKING ASSEMBLY FOR A LIGHTWEIGHT GEARBOX

(71) Applicant: AVX AIRCRAFT COMPANY, Benbrook, TX (US)

(72) Inventors: Ian W. Brown, Fort Worth, TX (US); Richard F. Murray, Pantego, TX (US)

(73) Assignee: AVX Aircraft Company, Benbrook, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,825

(22) Filed: Mar. 20, 2023

(65) Prior Publication Data
US 2023/0220869 A1    Jul. 13, 2023

Related U.S. Application Data

(63) Continuation of application No. 16/903,780, filed on Jun. 17, 2020, now Pat. No. 11,608,851.

(51) Int. Cl.
| | |
|---|---|
| *F16B 39/24* | (2006.01) |
| *F16B 39/10* | (2006.01) |
| *F16B 39/12* | (2006.01) |
| *F16B 39/282* | (2006.01) |
| *F16C 19/18* | (2006.01) |
| *F16C 35/063* | (2006.01) |

(52) U.S. Cl.
CPC ............ *F16B 39/24* (2013.01); *F16B 39/108* (2013.01); *F16B 39/12* (2013.01); *F16B 39/282* (2013.01); *F16C 19/18* (2013.01); *F16C 35/063* (2013.01); *F16C 2226/60* (2013.01); *F16C 2361/61* (2013.01)

(58) Field of Classification Search
CPC ........ F16B 39/10; F16B 39/108; F16B 39/12; F16B 39/14; F16B 39/24; F16B 39/282; F16B 43/00; F16C 19/18; F16C 35/063; F16C 2226/60; F16C 2361/61
USPC ......................................... 411/432, 433, 437
See application file for complete search history.

(56) References Cited

U.S. PATENT DOCUMENTS

| | | | | |
|---|---|---|---|---|
| 3,417,802 | A * | 12/1968 | Oldenkott | F16B 43/009 411/959 |
| 5,573,311 | A * | 11/1996 | Clohessy | F16C 35/063 301/124.1 |
| 5,618,143 | A * | 4/1997 | Cronin, II | F16D 41/061 411/948 |
| 5,772,373 | A * | 6/1998 | Cronin, II | F16B 39/108 411/948 |
| 7,927,052 | B1 * | 4/2011 | Varden | F16B 39/108 411/197 |
| 9,752,610 | B2 * | 9/2017 | Rousseau | F16B 39/12 |

(Continued)

*Primary Examiner* — Roberta S Delisle
(74) *Attorney, Agent, or Firm* — Davis Graham & Stubbs LLP

(57) ABSTRACT

A lock nut and tang washer mechanism preloads and locks components in a rotating environment. A drive system mechanism preloads and locks the device in a rotating environment and provides a double locking safety requirement needed in most aircraft for applications operating in an enclosed environment. The mechanism holds a required torque for the duration of the drive system operating life without the need for periodic visual inspections.

11 Claims, 7 Drawing Sheets

(56) References Cited

U.S. PATENT DOCUMENTS

| | | | |
|---|---|---|---|
| 11,608,851 B2* | 3/2023 | Brown | F16C 35/063 |
| 2004/0096289 A1* | 5/2004 | Bydalek | F16B 39/24 |
| | | | 411/161 |
| 2016/0245341 A1* | 8/2016 | Thomas | F16C 43/02 |
| 2019/0234447 A1* | 8/2019 | Chang | F16B 41/002 |

* cited by examiner

LOCKING ASSEMBLY FOR A LIGHTWEIGHT GEARBOX

BACKGROUND

Typical gearbox gear trains incorporate several rotating bearings, seals, and other sub-assemblies in the gearbox. The power from aircraft engines introduces very destructive vibration levels which causes loosening of hardware in gearbox assemblies within the aircraft engines. Current methods to prevent parts in the gearbox from coming loose and spreading themselves apart can be very time consuming to assemble. The gearbox gear train components require maintenance personnel to assemble, seat, and preload the components to a required torque while assembling a gearbox or during a gearbox repair. There are many embodiments of hardware that can be used to assist in these tasks. However, such embodiments often require three pieces of hardware to properly function. The hardware also tends to lose preload due to vibration, temperature, the reuse of existing retention hardware, or small radial movement during gearbox operation.

What is needed is a two-piece drive mechanism that preloads and locks components installed in a rotating environment and provides the double locking safety requirement needed in most aircraft for applications operating in an enclosed environment. The mechanism should also hold the required torque for the duration of the drive system operating life without the need for periodic visual inspections.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides a double locking nut assembly for a lightweight gearbox. In various embodiments, the assembly includes a bearing assembly coupled with a gear shaft inside the lightweight gearbox. A nut washer coupled of the locking nut assembly includes a plurality of tangs that are operatively disposed within grooves disposed longitudinally in threads of the gear shaft to prevent rotation of the nut washer with respect to the gear shaft. A lock nut is provided, containing a serrated deformation locking design that allows ramps of the serration to slide on the washer while applying installation nut torque. As the installation torque is applied, the face of the nut washer deforms and becomes compliant to the serration form and offers mechanical resistance to un-torquing the lock nut.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

The present technology relates to lock nut and washer mechanisms that preload and lock components in a rotating environment. In particular, with reference to FIGS. 1-7, a unique drive system mechanism is presented that preloads and locks the components in a rotating environment and provides a double locking safety, which is required in most aircraft, for applications operating in an enclosed environment. This mechanism holds the required torque for the duration of the drive system operating life without the need for periodic visual inspections. One of various contemplated uses for this mechanism, shown in FIGS. 1-5, would be to seat and preload a rotating bearing or bearing set on a shaft bearing journal and visually show an inspector that the mechanism will not come off the rotating shaft, even if the mechanism was not properly preloaded. The present technology eliminates previously known requirements for locking wires, retaining rings, and locking screws, while not affecting the assembly balance.

Figure 1:
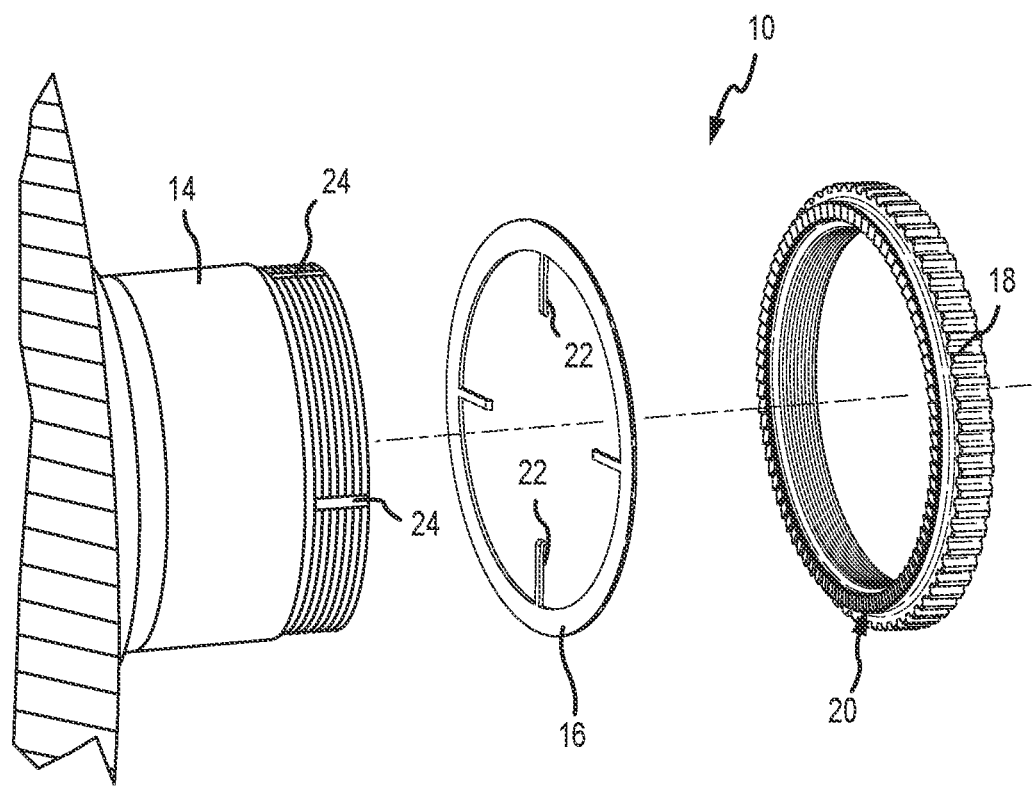
FIG. 1 depicts a partially exploded view of an embodiment of a locking nut assembly for a lightweight gearbox according to the present technology.
Figure 2:
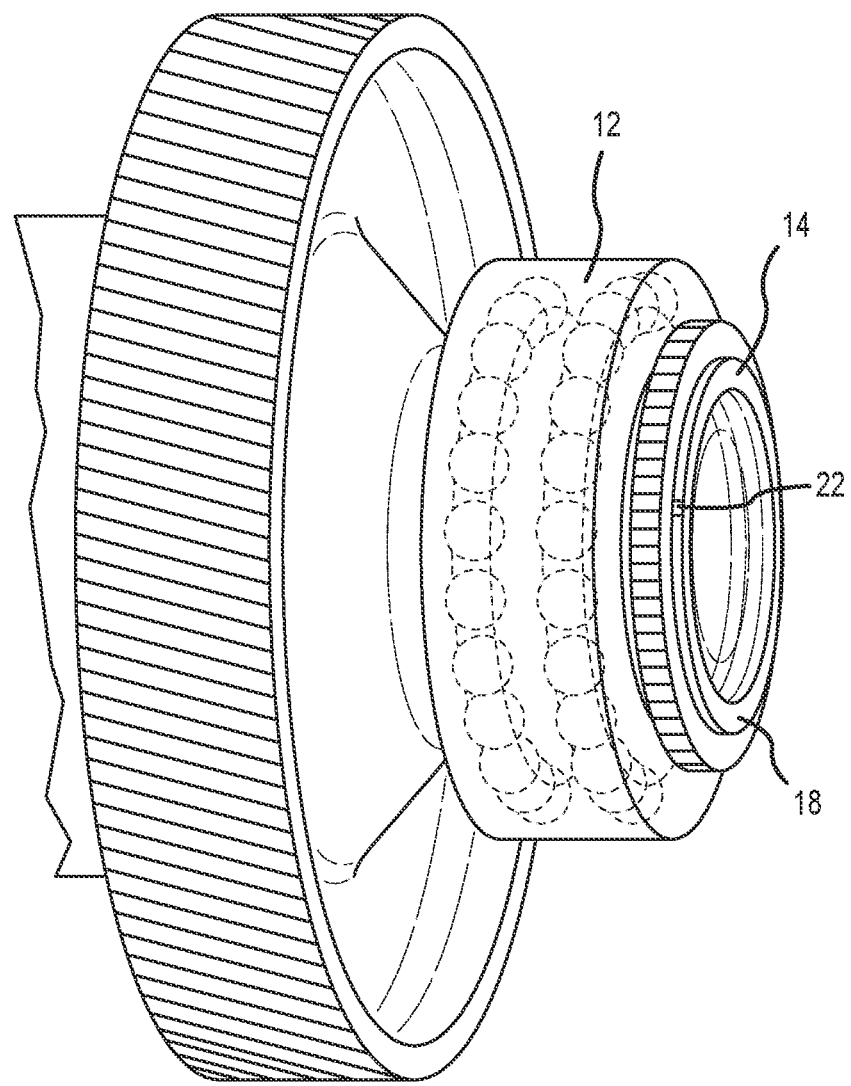
FIG. 2 depicts the locking nut assembly of FIG. 1 as it may be coupled with a bearing assembly and gear shaft of the lightweight gearbox.
Figure 3:
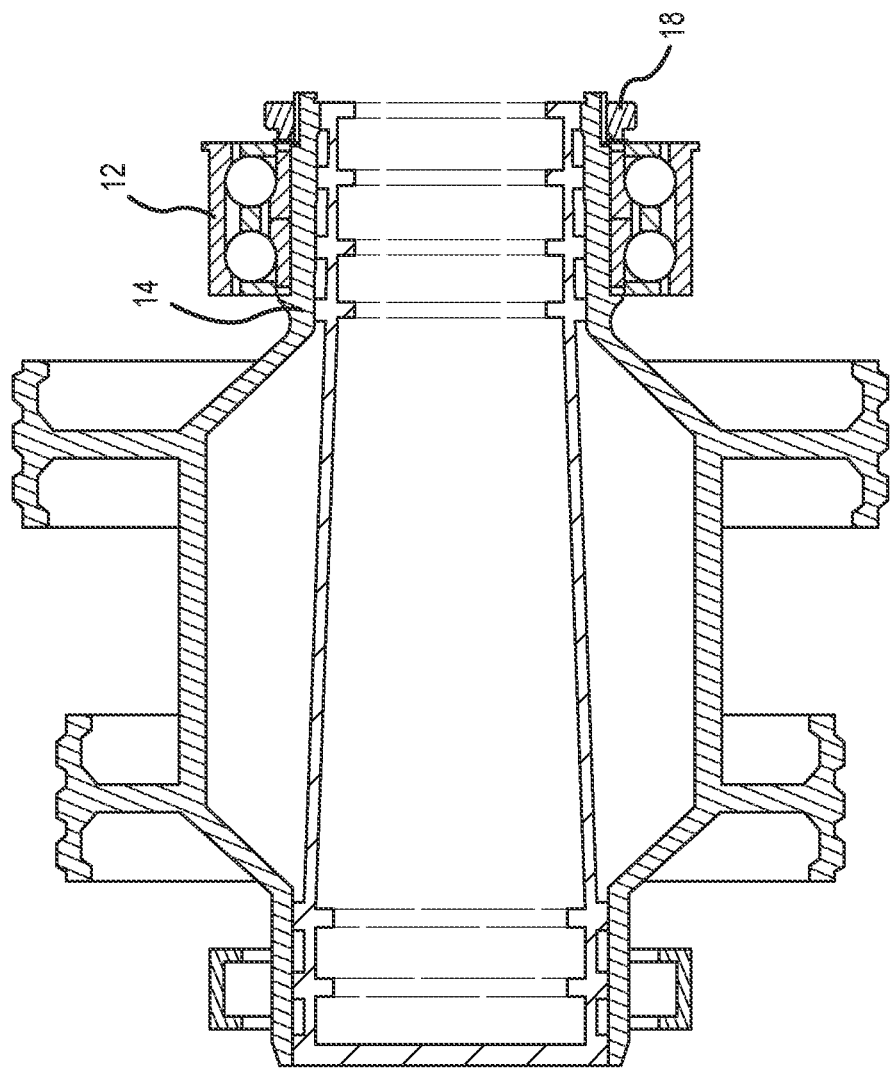
FIG. 3 depicts a cut-away, side elevation view of the locking nut assembly, bearing assembly, and gear shaft of FIG. 2.
Figure 4:
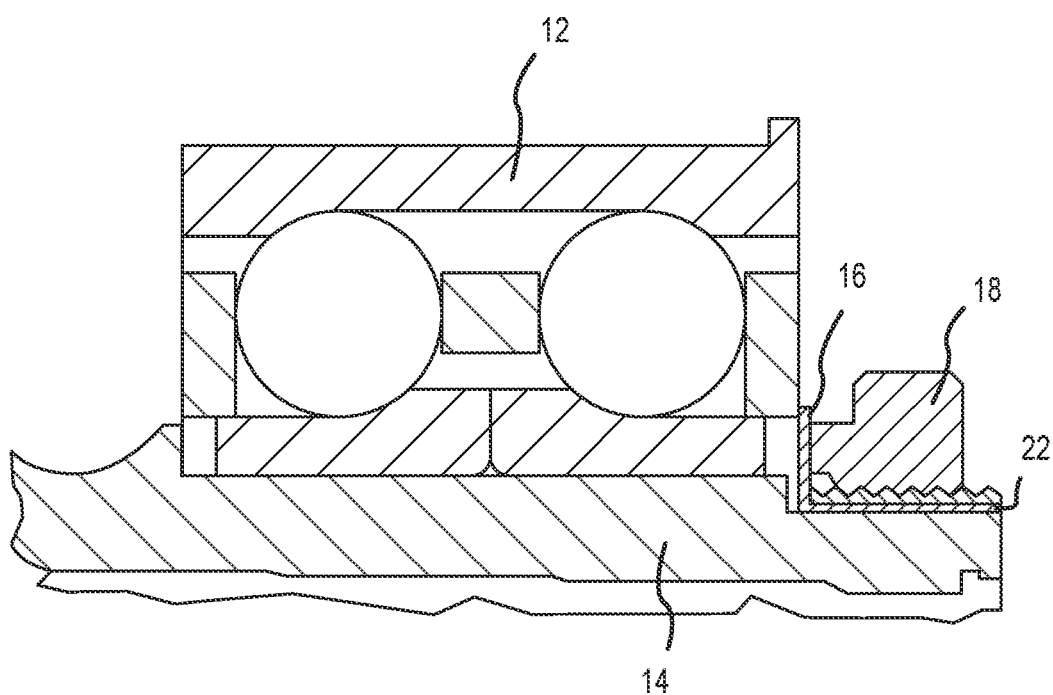
FIG. 4 depicts a cut-away, isometric view of the locking nut assembly and bearing assembly of FIG. 3.

With reference to FIG. 1, an overview of one embodiment of a double locking nut assembly 10 for a lightweight gearbox is depicted. The depicted locking nut assembly 10 is shown attaching a double row duplex ball bearing assembly 12 to a double geared shaft 14 inside a lightweight gearbox for air cushion vehicles. However, other applications of the present technology are contemplated for coupling various bearing assemblies and the bearing journals of gear shafts with one another.

In particular embodiments, the locking nut assembly 10 properly seats the bearing assembly 12 and provides enough stretch in the gear shaft 14 to keep an appropriate gear-bearing assembly preload, while allowing for small changes in surface topography between the clamp-up of all shoulder surfaces. In various embodiments of the present technology, a nut washer 16, having opposing faces, and a lock nut 18, having a locking face 20. are provided. The locking face 20 of the lock nut 18 includes a serrated deformation locking design such that a right-handed threaded lock nut 18 would contain a right handed spiral ramp. This allows the ramps of the serration to slide against a face of the nut washer 16 while applying the proper installation nut torque required to seat and preload the bearing assembly 12. In particular embodiments, the nut washer 16 is formed from a material that is softer than the lock nut 18. In such embodiments, after the bearing run-on and installation torque is applied and recorded, the face of the nut washer 16 will deform and become compliant to the serration form and offer mechanical resistance to un-torquing the lock nut 18.

Figure 5:
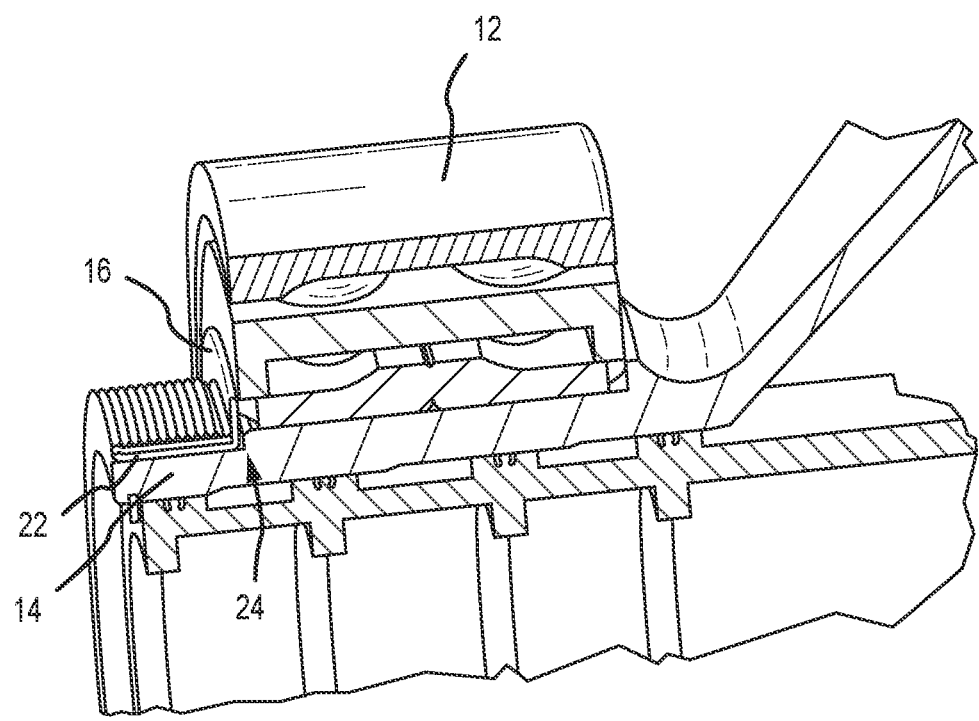
FIG. 5 depicts a partial, cut-away view of one embodiment of nut washer of the present technology as the same could be coupled with a gear shaft and bearing assembly of a lightweight gearbox.
Figure 6:
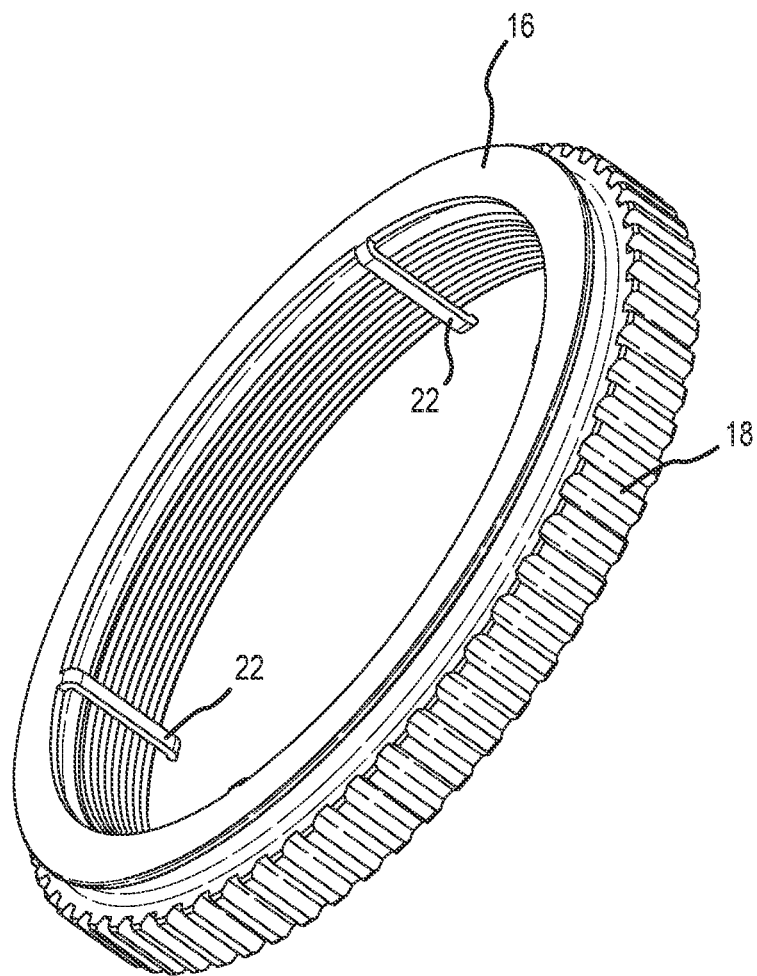
FIG. 6 depicts a perspective view of an embodiment of a nut washer and lock nut of the present technology.

In various embodiments, the nut washer 16 mated with the lock nut 18 is not allowed to rotate in an assembled position. In some such embodiments, the nut washer 16 may include a plurality of tangs 20, shown in FIGS. 1, 5, and 6, to prevent rotation of the lock nut 18. With reference to FIG. 1, the tangs 22 extend radially inwardly from an interior peripheral edge portion of a base of the nut washer 16, such that the tangs 22 are coplanar with the base in a pre-installation position. The tangs 22 of the nut washer 16 are shaped and positioned to align with, shaped to be disposed within, tang grooves 24 that are disposed longitudinally in the threads of the gear shaft 14. Tang grooves 24, formed in the threads of the gear shaft 14, are shown in FIGS. 1 and 5. The tang grooves 24 and tangs 22, when engaged with one another, prevent rotational movement of the nut washer 16 with respect to the gear shaft 14. To initiate installation, the tangs 22 are aligned with the tang grooves 24. The tangs 22 are selectively bent up, into the tang grooves 24 (FIG. 5) and against the threads of the lock nut 18 (FIG. 6), as the lock nut 18 is threaded onto the threads of the gear shaft 14 and the lock nut 18 torque is witnessed and recorded. In particular applications, just one of the tangs 22 will prevent the lock nut 18 from rotating off of the gear shaft 14.

Figure 7:
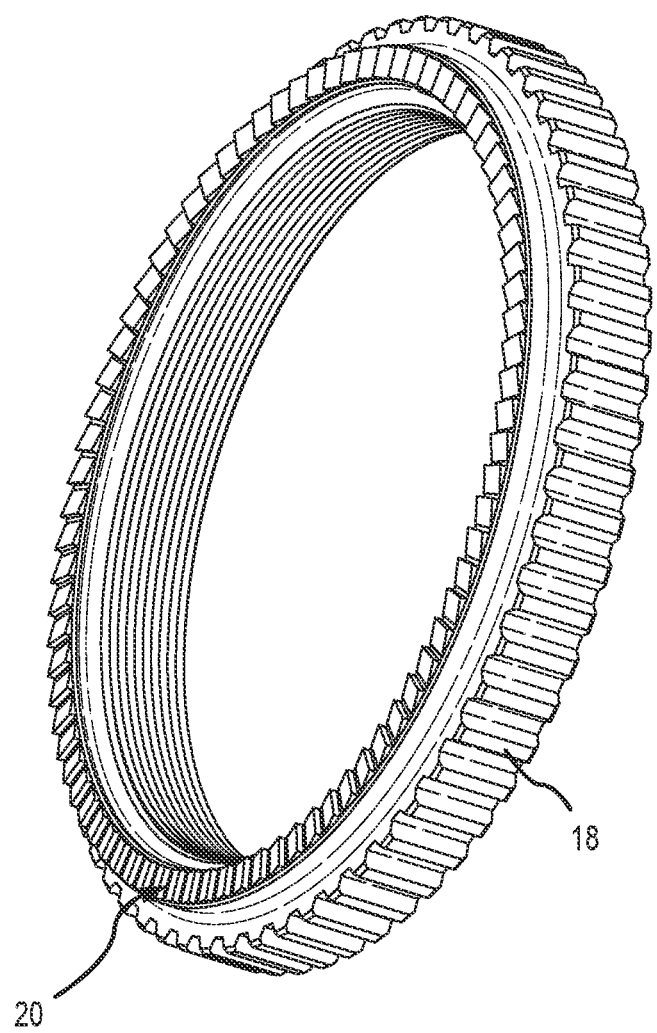
FIG. 7 depicts a perspective view of an embodiment of a lock nut of the present technology.

Applications using relatively large lock nuts 18 may require more than four tangs 22. In particular embodiments, the tool spline utilized on the bearing nut is a 30-degree, 10/20 pitch, Class 3 Spline per ANSI B91.1-1996, such as depicted in FIG. 7. It will be appreciated that the number of teeth is dependent on the size of the required locking nut 18. The torque tool required to apply the nut torque in the depicted embodiment is the mate to the spline noted above. Those of skill in the art will appreciate that the thickness of the lock nut 18 is determined by the measure required to achieve at least five full threads of engagement. The recommended thread pitch is sixteen threads per inch. This assures the serrated locking face 20 of the lock nut 18 backs off of the nut washer 16 during removal of the lock nut 18, when the serrations are going against the ramp, and minimizes the tearing of the washer material. The thickness of the nut washer 16 is dependent on the size of the bearing assembly 12 or component requiring the locking feature. In various embodiments, the nut washer 16 is provided for onetime use. The lock nut 18, however, can be used multiple times.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A locking assembly for coupling a bearing assembly with a gear shaft, the assembly comprising:
 a nut washer having a base and at least one tang that extends radially inwardly from an interior peripheral edge portion of the base, such that the tang is coplanar with the base in a pre-installation position;
 the tang being selectively bendable into an installation position that is not coplanar with the base.

2. The locking assembly of claim 1 wherein:
 the at least one tang is shaped and positioned to align with, and be disposed within, a tang groove disposed longitudinally in threads of the gear shaft to prevent rotation of the nut washer relative to the gear shaft.

3. The locking assembly of claim 2 further comprising:
 a lock nut having a threaded interior face that is shaped to operatively engage the threads of the gear shaft and the at least one tang to prevent rotation of the nut relative to the gear shaft.

4. The locking assembly of claim 3 wherein:
 the lock nut includes a locking face with a serrated deformation locking design that allows ramps of the serration to slide on a face of the nut washer body when applying installation nut torque.

5. The locking assembly of claim 4 wherein:
 the serrations are positioned to go against a ramp direction, such that the serrated locking face backs off the nut washer during lock nut removal and minimizes the tearing of the nut washer.

6. The locking assembly of claim 4 wherein:
 two opposing tangs are bent up after a nut torque is witnessed and recorded to serve as a safety device within the locking assembly.

7. The locking assembly of claim 1 further comprising:
 a plurality of tangs shaped and positioned to align with, and be disposed within, a plurality of tang grooves disposed longitudinally in threads of the gear shaft to prevent rotation of the nut washer relative to the gear shaft.

8. A locking assembly for coupling a bearing assembly with a gear shaft, the assembly comprising:
 a nut washer having a base and at least one tang that extends radially inwardly from an interior peripheral edge portion of the base, such that the tang is coplanar with the base in a pre-installation position; and a lock nut having a threaded interior face that is shaped to operatively engage the threads of the gear shaft and the at least one tang to prevent rotation of the lock nut relative to the gear shaft.

9. The locking assembly of claim 8 wherein:

the at least one tang is shaped and positioned to align with, and be disposed within, a tang groove disposed longitudinally in threads of the gear shaft to prevent rotation of the nut washer relative to the gear shaft.

10. The locking assembly of claim 8 wherein:

the lock nut includes a locking face with a serrated deformation locking design that allows ramps of the serration to slide on a face of the nut washer body when applying installation nut torque.

11. The locking assembly of claim 10 wherein:

two opposing tangs are bent up after a nut torque is witnessed and recorded to serve as a safety device within the locking assembly.

\* \* \* \* \*